United States Patent [19]
Barber et al.

[11] Patent Number: 5,469,404
[45] Date of Patent: Nov. 21, 1995

[54] METHOD AND APPARATUS FOR SEISMIC EXPLORATION

[76] Inventors: Harold P. Barber, 33002 Wakefield Ct., Fulshear, Tex. 77441; Clyde Lee, 6321 Del Monte, Houston, Tex. 77057

[21] Appl. No.: 289,177

[22] Filed: Aug. 11, 1994

Related U.S. Application Data

[63] Continuation-in-part of Ser. No. 975,484, Nov. 12, 1992, abandoned.

[51] Int. Cl.⁶ .................................................... G01V 1/38
[52] U.S. Cl. .............................. 367/23; 367/16; 367/57; 181/115
[58] Field of Search ................................ 367/16, 23, 24, 367/57; 181/111, 115, 118, 120

[56] References Cited

U.S. PATENT DOCUMENTS

| | | | |
|---|---|---|---|
| 1,998,412 | 4/1935 | Prescott | 181/0.5 |
| 3,310,128 | 3/1967 | Chelminski | 181/0.5 |
| 3,653,460 | 4/1972 | Chelminski | 181/0.5 |
| 3,953,826 | 4/1976 | Brundrit et al. | 340/7 PC |
| 4,141,431 | 2/1979 | Baird | 131/118 |
| 4,170,002 | 10/1979 | Strange | 181/115 |
| 4,242,740 | 12/1980 | Ruehle | 367/15 |
| 4,254,480 | 3/1981 | French | 367/23 |
| 4,326,271 | 4/1982 | Ziolkowski | 367/16 |
| 4,396,088 | 8/1983 | Bayhi | 181/120 |
| 4,686,660 | 8/1987 | Gjestrum et al. | 367/153 |
| 4,715,023 | 12/1987 | Otto | 367/144 |
| 4,716,553 | 12/1987 | Dragsund et al. | 367/15 |
| 4,719,987 | 1/1988 | George, Jr. et al. | 181/114 |
| 4,721,180 | 1/1988 | Haughland et al. | 181/111 |
| 4,739,858 | 4/1988 | Dragoset | 181/115 |
| 4,956,822 | 9/1990 | Barber et al. | 367/23 |
| 5,184,329 | 2/1993 | Regnault et al. | 367/23 |
| 5,212,669 | 5/1993 | Jenkins | 367/23 |

OTHER PUBLICATIONS

"Effects of Marine Source Array Directivity On Seismic Data And Source Signature Deconvolution:", by Loveridge et al., First Break, vol. II, No. 2 p. 16.

"The Delft Airgun Experiment", by Anton Ziolkowski, First Break, Jun. 1984 Edition, pp. 9–18.

"The Determination Of The Far–field Signature of An Interacting Array Of Marine Seismic Sources From Near–Field Measurements—Results From The Delft Air Gun Experiment", by Anton Ziolkowski, First Break, vol. 5, No. 1, pp. 15–29.

"On the Quality Control Of Datagun Arrays", by Safar et al., First Break, Nov. 1983, pp. 13–17.

"Marine Source Array Directivity: A New Wide Airgun Array System", by Parkes et al., First Break, Jul. 1984, pp. 9–15.

"Test Results Of A New Type Of Efficient Small Airgun Array", by M. H. Safar, Geophysical Prospecting, vol. 31, pp. 343–350 (1983).

"Development Of More Efficient Airgun Arrays: Theory and Experiment", by R. C. Johnston, 1982. Geophysical Prospecting, vol. 30, pp. 752–773.

(List continued on next page.)

*Primary Examiner*—Nelson Moskowitz
*Attorney, Agent, or Firm*—Bush, Moseley, Riddle & Jackson

[57] ABSTRACT

A marine seismic signal source apparatus and method that maximizes the usable acoustical (db) energy of the array signature in a lower frequency bandwidth. The apparatus forms a three dimensional 2×4×2 array having a plurality of 8 air guns of identical firing chamber size (10 cubic inch) operably arranged in pairs at different water depths. Firing of the guns in a top to bottom time delayed sequence shifts the frequency domain of the peak acoustical db signal to concentrate the usable seismic energy in the deeper earth formation penetrating range. The frequency boundaries of the bandwidth of the occurrence of the peak 6 db increment of acoustical power are lowered and compressed into a narrower bandwidth by the firing sequence.

9 Claims, 3 Drawing Sheets

OTHER PUBLICATIONS

"Signature and Amplitude Of Linear Airgun Arrays", by J. J. Nooteboom, *Geophysical Prospecxting* 26, pp. 194–210 (1978).

"Attenuation Of Coherent Noise In Marine Seismic Exploration Using Very Long Arrays", by B. Ursin, Geophysical Prospecting, vol. 26, pp. 722–749 (1978).

"Interaction Effects In Marine Seismic Source Arrays", by Sinclair et al., *Geophysical Prospecting* vol. 28, pp. 323–332.

"Efficient Design Of Air–Gun Arrays", by M. H. Safar, Geophysical Prospecting, vol. 24, pp. 773–787.

"The Signature Of An Air Gun Array: Computation From Near–Field Measurements Including Interactions—Practical Considerations", by Parkes et al., Geophysics vol. 48, No. 2, Feb. 1984.

"The Signature Of An Air Gun Array: Computation From Near–Field Measurements Including Interactions", by A. Ziolkowski et al., Geophysics vol. 47, No. 10 pp. 1413–1421, Oct. 1982.

"Extended Arrays For Maine Seismic Acquisition", by Lofthouse and Bennett, Geophysics, vol. 43, No. 1, pp. 3–22, Feb. 1978.

"Air–gun Source Instabilities", by Dragoset et al., Geophysics, vol. 52, No. 9 pp. 1229–1252, Sep. 1987.

"A New High–resolution Or Deep Penetration Airgun Array", by Brandsaeter et al., Geophysics, vol. 44, No. 5, pp. 865–879, May 1979.

"Some Geometric Aspects Of Towed Air Gun Arrays", by Teer et al., OTC 4254 (Offshore Technology Conference), May 1982 OTC.

"Stagaray System Improves Primary Pulse/Bubble Ratio In Marine Exploration", by J. Kologinczak, OTC 2020, May 1974 OTC.

"Marine Seismic Energy Sources: Acoustic Performance Comparison", by Roy C. Johnston, OTC 4255, May 1982 OTC.

"Applications Of Air Gun Energy Source For Offshore Seismic Work", by Hans Edelman, OTC 2513, May 1976 OTC.

"Comprehensive Method For Evaluating The Design Of Guns And Airgun Arrays", by V. H. Dragoset, OTC 4783, May 1984 OTC.

"A VCersatile Energy Source Control System For Seismic Exploration Applications", by R. L. Roark, Jr., OTC 2514, May 1976 OTC.

"A Modern Marine Seismic System", by Pulju et al., OTC 2021, May 1974 OTC.

"The Mini Spread", by Burt et al., OTC 2177, May 1975 OTC.

"Seismic Signatures Of Air Guns", by Mayne et al., OTC 1207, Apr. 1970 OTC.

"Maintaining Three–Dimensional Integrity Of A Tuned Source Array", by Lauhoff et al., OTC 2783, May 1977 OTC.

"A Comprehensive Method For Evaluating The Design Of Air Gun Arrays", by William H. Gragoset, Geophysics, The Leading Edge of Exploration, Oct. 1984, pp. 52–61.

"Directivity And Other Characteristics Of A Wide Airgun Array System", by Parkes, et al., Geophysics, Oct. 1981.

"Three Dimensional Air Gun Arrays", by G. C. Smith, Geophysics, 1984 Marine II, 1984.

"Effects Of Air Gun Firing Time Variations On Signal Stability", by W. R. Cotton et al.

"Super–Tuned Air Gun Arrays", by W. R. Cotton, Oct. 1987.

Painter et al, 53rd EAEG Mtg, Italy, May 30, 1991, Abstract 168–169; abstract only supplied herewith.

| BAR-M | 5.38 |
| --- | --- |
| P/B | 48.75 |
| PERIOD | 69.25 |

FIG. 8

| DB(MAX) | 179.97 |
| --- | --- |
| FREQ. | 129.86 |
| DB(MIN) | 171.92 |
| FREQ.(MIN) | 34.16 |

BANDWIDTH = 26 TO 233
K JOULES/M² = 0.12

FIG. 9

METHOD AND APPARATUS FOR SEISMIC EXPLORATION

CROSS-REFERENCE TO RELATED PATENT

This application is a continuation-in-part of application Ser. No. 07/975,484 filed Nov. 12, 1992, now abandoned, and is related to the inventions disclosed and claimed in our U.S. Pat. No. 4,956,822, issued Sep. 11, 1990.

FIELD OF THE INVENTION

This invention relates generally to seismic exploration of earth formations underlying a body of water, and particularly to use of a tapered, heavy center seismic source array that produces when fired a distribution of pulse spectra that maximizes source energy and minimizes loss of energy in the earth.

BACKGROUND OF THE INVENTION

Marine seismic exploration of earth formations located below a body of water, usually offshore, is a well known technique of prospecting for hydrocarbons or other natural resources. Marine seismic exploration also can be used to obtain engineering survey data respecting shallow formations for siting and foundation design of offshore structures such as jack up rigs or permanent platforms for drilling and production operations.

In principal and in theory, seismic prospecting is relatively simple. A pulse of acoustic energy is produced which travels downward into the earth and is reflected back upward at interfaces between strata which have acoustic impedance mis-matches. The arrivals of reflected acoustic waves are detected by hydrophones and recorded by suitable instrumentation. By suitable calculations (including source signal deconvolution) or other processing of the recorded data, the depth, arrangement and thickness of the various underground formations as well as other significant characteristics may be determined with reasonable precision, and such information used to predict where hydrocarbons might be found by a exploratory well.

In actual practice however, the detection and data processing of the reflected acoustic energy data in order to produce reliable predictions is extremely complex and quite difficult. Each seismic source produces an energy signal having unique characteristics, commonly called its signature. In deconvolution the signature characteristics are used to adjust the recorded data for those known imperfections in the seismic signal. Separating a true reflected seismic signal from noise or other signal echoes present in the recorded data is an extremely difficult task and requires a great deal of skill and expertise. Furthermore, the characteristics of the acoustic pulses or signals that are actually generated by the seismic source can greatly increase the difficulty of sensing or detecting the proper reflected energy. False detection of the reflected energy will, or course, render the seismic determinations based on that information incorrect.

Numerous efforts and approaches have been made to improve the characteristics or signatures of seismic pulses or source signals in order to enhance the seismic exploration process. For example, Prescott U.S. Pat. No. 1,998,412 discloses the idea of distributing the explosive elements of a land seismic source vertically in a borehole and exploding them in succession from top to bottom. The objective was to cancel or reduce the amplitude of so-called "trailer" waves and improve the signal-to-noise ratio. Another U.S. Pat. No. 4,721,180 (Haughland et al) discloses a marine seismic source having vertically spaced subarrays of air guns which are fired shallowest first and deepest second. The arrangement is intended to attenuate both the bubble pulse oscillations and the "ghost" pulse arrivals which occur even in arrays that are "tuned" by selection of air gun sizes and spacing. Another related disclosure is a publication entitled "Three-Dimensional Air Gun Arrays", by Smith, G. C. published in *Marine II*, 1984. This publication focuses on increasing the efficiency of arrays of air guns (source strength per amount of air used) towed at different depths and fired at different times. The delay times are equal to depth difference divided by the velocity of sound through water. The air gun array proposed by Smith has a total volume of 5,560 cubic inches and employs four identical subarrays of 7 different sized guns. Each subarray was 19 meters long with larger guns near the front and smaller guns at the back. The subarrays were positioned on both the port and starboard sides of the towing vessel to form a wide array. Both uniform and nonuniform (coalesced) spacing of the different chamber size air guns on each side was employed. The four subarrays were towed at depths ranging from 5.4 to 11.0 meters with a sequenced firing time range of 0 to 3.75 ms. The timing of gun firing was sequenced to achieve in phase summation of the primary output signal. Other publications having overall relation to the problems involved in marine seismic exploration are reviewed in our U.S. Pat. No. 4,956,822 which is incorporated hereby by references.

Our U.S. Pat. No. 4,956,822 discloses a compact tricluster source array configuration or geometric arrangement for providing a tapered, heavy center, point source seismic signal useful in engineering type surveys when the guns are simultaneously discharged at a relatively shallow depth (1 to 3 meters). The disclosed geometric arrangement of the tricluster array employs eight air guns of equal volume size in a paired or clustered arrangement. The identifying number used after "tricluster" denotes the total firing chamber volume of the eight air guns employed. For example, the tricluster 80 which has a total of eight 10 cubic inch guns, provides a total chamber volume of 80 cubic inches, and the tricluster 160 uses eight 20 cubic inch guns for a total diameter volume of 160 cubin inches. The tricluster 320 employs eight 40 cubic inch guns for a total volume of 320 cubin inches. As each of the eight (8) air guns forming the tricluster are preferably substantially identical in construction, and have the same firing chamber volume size and are operated at the same air pressure, the output characteristics of each gun is substantially identical to all of the other air gun sources employed in the tricluster array.

The geometric arrangement of the tricluster array may be described generally as a symmetrical 2×4×2 configuration. A front pair of parallel guns are followed by a center cluster of 4 parallel guns and a rear pair of parallel guns. The center cluster of 4 guns is constructed by upper and lower pairs disposed midway between the front and rear pairs. In the '822 patent the horizontal spacing between paired guns is 20 in. and the distance between the center point of the front and back pairs and the center point of four gun cluster is about 5 feet or 60 in. The front and rear pairs of guns are disposed in a reference horizontal plane, and the upper and lower pairs of air guns in the center cluster are vertically spaced by 20 in. Thus the upper horizontal plane of the upper pair is 10 inches above the reference horizontal plane, and the horizontal plane of the lower cluster pair is located 10 in. below such reference plane. The compact, close spacing of the guns insures their operating interaction.

In forming the measured or calculated output signal (far field signature) of the tricluster or other array, the individual output signals of the air guns are combined. Whether an in-phase combining with magnitude reinforcement occurs or an out-of-phase combining with destructive interference of the magnitude occurs, signature is an extremely complex determination and is dependent on a number of factors including the length of the combining path, the wave length and the speed or velocity of the output wave or pulse. The measured tricluster 80 array far field signature or output signal is illustrated in FIGS. 6 and 9 of applicants' U.S. Pat. No. 4,956,822 while that of the smaller total chamber volume tricluster 32 is illustrated in FIGS. 7 and 8. In producing all of the measured far field signature signals all eight guns were fired simultaneously. For the tricluster 80 the amplitude characteristic was 7.1 bar-meters and a primary-to-bubble ratio of 94.9 was obtained, while that of the tricluster 32 was 4.0 bar-meters and a primary-to-bubble ratio of 60.0. The slight differences in measured data for each tricluster size is due to the speed of measurement sampling and to the bandwidth filter range employed (FIG. 6 is 27 to 256 Hz while that of FIG. 9 is 115 Hz to 1,024 Hz). Although the array shown in the '822 patent works quite well in practice, applicants have discovered a technique for firing the individual pairs of air guns in a manner that maximizes the acoustic energy in a useable range of seismic frequencies.

In the prior art as exemplified by the Smith publication and the Haughland patent noted above, sequential firing of vertically spaced subarrays is suggested as a way to suppress "ghost" reflections and improve the peak-to-bubble ratio. Specifically, the shallowest guns are fired first, the next shallowest second, and so forth, with a time delay equal to depth difference divided by the velocity of sound in water. In effect, the time delays are used to hopefully match the transit velocities in the direction in which transmission is desired and to attenuate the seismic signal in other directions. Applicants have discovered that the foregoing approach does not maximize the sonic energy produced by an array in a frequency range that is the most useful in seismic exploration, and that an overdelay is more effective in shaping a seismic pulse which has minimum attenuation in the subsurface formations. According to this invention, a delay time is used which insures that the firing of guns at any level occurs after the initial wave front due to forcing of the upper guns has passed that location.

One object of the present invention is to provide an array of seismic source air guns that are fired in a manner to shape the output energy wave so the preponderance of the usable energy produced is concentrated in a useful range of frequencies.

Another object of the present invention is to fire an array of air guns in a manner which controls the output wave energy such that it is predominantly in a usable frequency spectrum.

Yet another object of the present invention is to provide a firing sequence for a plurality of air guns which reduces the frequency range of the usable seismic bandwidth.

SUMMARY OF THE PRESENT INVENTION

These and other objects are attained in accordance with the principles of the present invention through the provision of a new and improved high resolution marine seismic signal source including an array of identical size air guns which when energized generate a powerful, broad band pulse that is largely free of bubble pulse oscillations. The depth of the horizontally disposed air guns below the water surface is relatively shallow and in the range of from 1 to 3 meters. The array includes eight guns arranged in three horizontal planes or levels, with the upper level containing two guns as a laterally spaced pair, the mid-level containing four guns which are the front and rear laterally spaced pairs, and the lower level containing two guns as a laterally spaced pair. The guns are all equally distributed about a longitudinal axis of symmetry to provide a tapered, heavy center, point source.

It has been found that when the three levels of air guns are fired sequentially from top to bottom with a 1.7 msec delay between each firing event, which is a delay time which insures that the firing of respective lower gun levels occurs after the initial wave front from upper guns has passed their level, the resultant sonic pulse has a wave shape and distribution of pulse spectra such that the total energy is maximized and attenuation by the earth formation is minimized. This firing technique provides a high resolution source having good penetration, including but not limited to relatively shallow targets located below the ocean floor.

DESCRIPTION OF A PREFERRED EMBODIMENT

Figure 1:
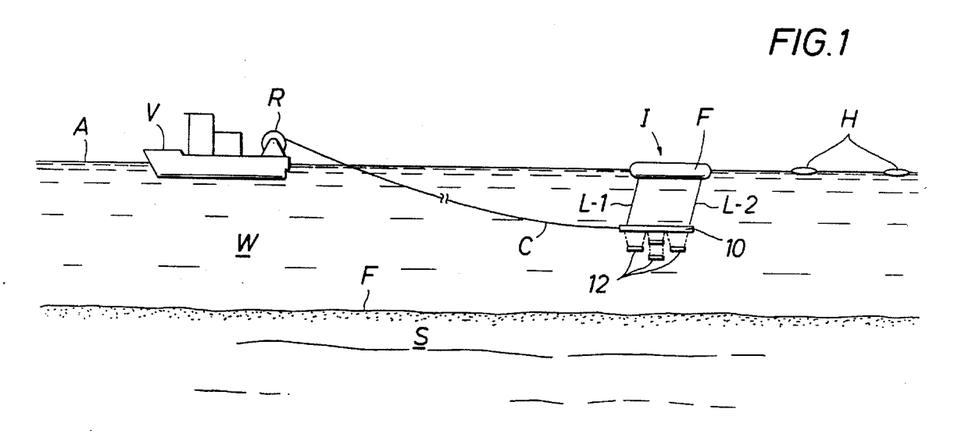
FIG. 1 is a schematic side view of a floating vessel towing the marine seismic signal source of the present invention through a body of water.

Referring initially to FIG. 1, a suitable self propelled marine seismic vessel V is shown traversing a body of water W. The water W covers subsurface formation S which are to be investigated by seismic exploration techniques using the present invention. The air-water interface is defined by the water surface A, and the water-earth interface by the bottom surface F. Although a typical offshore marine environment found in bays, oceans, gulfs and the like is shown, it will be understood that the present invention may be used in any other marine environment such as a river, swamp, marsh, etc. The vessel V tows a seismic source I on a cable or harness C which is wound on a reel R. The source I includes an array of air guns 12 which are suspended from a frame 10, and the frame is suspended underwater by cables L-1 and L-2 and a float F. A streamer cable H can be towed behind the float F, and although shown schematically as being on the surface A is actually submerged somewhat.

Conventional support equipment for handling, remotely operating and transporting the array 10 is mounted on-board the vessel V. Such support equipment and its use and operation are well known to those skilled in the art and need not be set forth in detail. The streamer cable H includes spaced transducers such as hydrophones which respond to acoustic wave reflections from the subsurface formations and produce output signals which are transmitted to the vessel V in the usual and conventional manner for recording, monitoring, observation, etc. The source I preferably is towed ahead of the streamer cable H. The harness C includes high pressure air supply conduits and firing lines for the source I. The firing control means is located on the vessel V.

The air gun array 12 for producing new and improved seismic pulses in accordance with the present invention is illustrated in detail in FIGS. 2–5. The array includes a support frame, generally designated 10, which mounts a total of eight air guns 12. The air guns 12 are all identical and are conventional, commercially available types that need not be described in detail here. The support frame 10 is generally rectangular and has longitudinally extending side members 14 and 16 connected by longitudinally spaced, parallel cross braces 18, 20, 22 and 24. Any desired manner of construction of the frame 10 may be employed, such as welding, riveting, etc. However for ease of assembly and transportation a bolted construction of conventional steel beam members is preferred. After fabrication a suitable protective coating can be applied to retard corrosion of the support frame 10.

Figure 3:
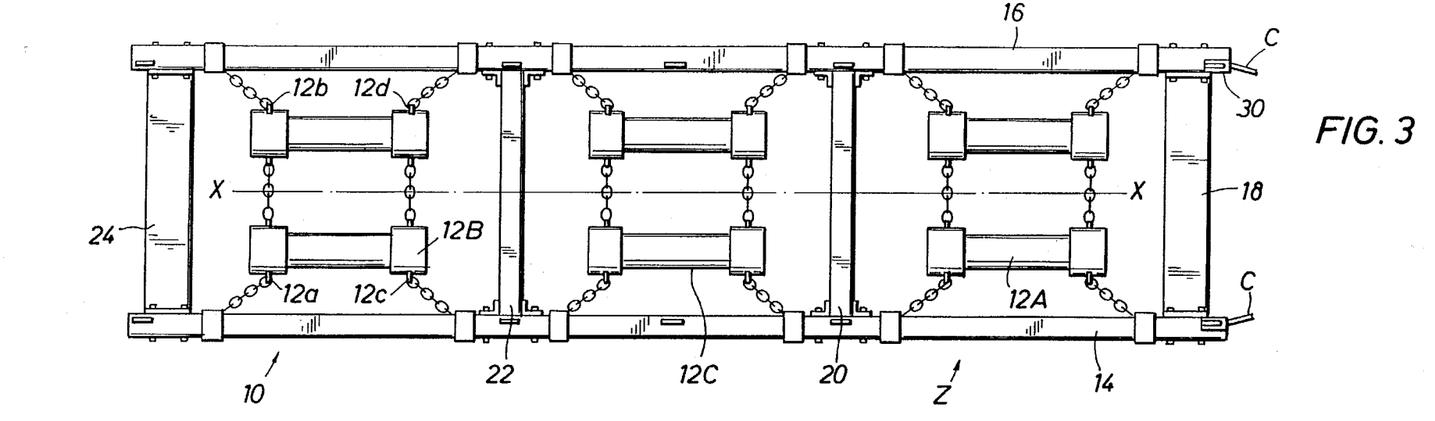
FIG. 3 is a top view of the marine seismic signal source.

Secured to the upper side of the frame assembly 10, preferably on each of the side members 14 and 16, are a plurality of attachment fittings 26. Each of the attachment fittings 26 is provided with a hole or opening 28 for receiving a connection bolt of a conventional end fitting secured to one end of an attachment chain or line, such as the yoke fittings 30 at the end of the towing cable apparatus C (FIG. 3). The end fittings 26 thus provide a means to secure the support frame 10 to the towing cable apparatus C which extends from the marine vessel V to enable the frame to be pulled through the water W. Of course other means or arrangements for securing the support frame 10 to the towing cable apparatus C will be apparent to those skilled in the art.

The attachment fittings 26 also function to assist in suspending the frame 10 at a desired depth in the water W below the water surface A. The buoyant member or float F (FIG. 1) has mounted thereon a plurality of chains, cables or support lines L-1 and L-2 which extend downwardly into the water for attachment to the frame 10 using the attachment fittings 26. The length of the lines L-1 and L-2 determines the depth of the frame 10 and the air guns 12 below the water surface A. Preferably the air guns 12 are disposed at a relatively shallow depth of 1 to 3 meters below the surface A to minimize reflection of ghost echoes and the production of bubble pulsations.

Figure 2:
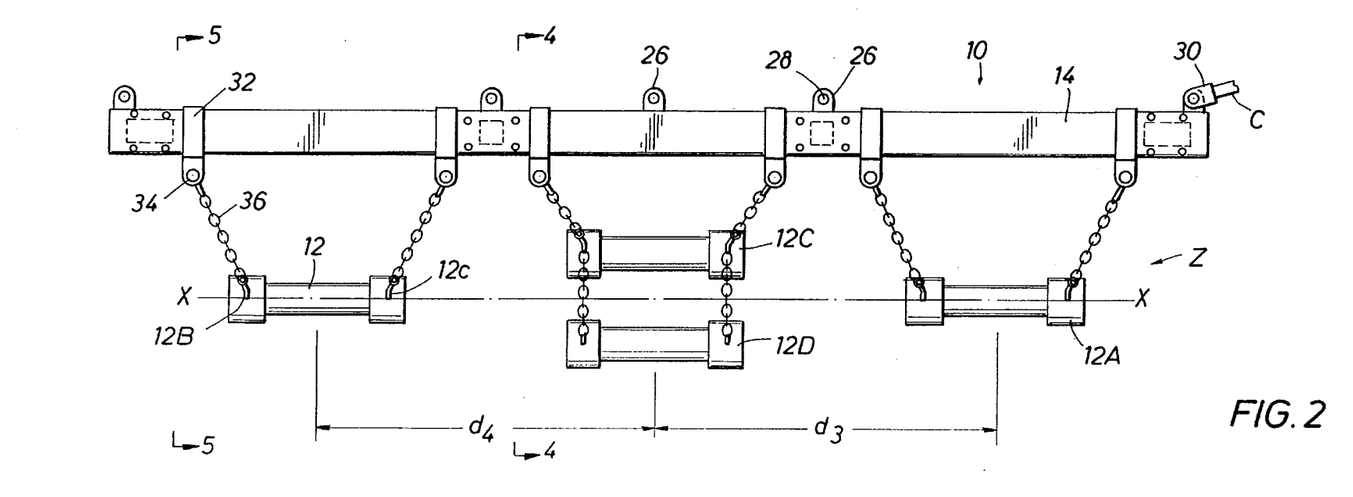
FIG. 2 is a side view of the marine seismic signal source of FIG. 1.
Figure 4:
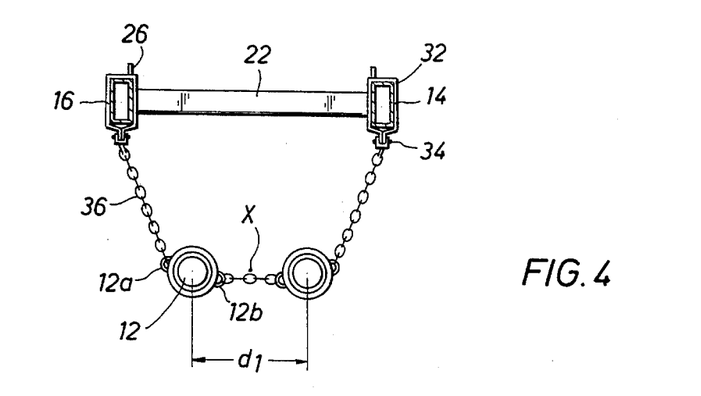
FIG. 4 is a view taken along line 4—4 of FIG. 2.
Figure 5:
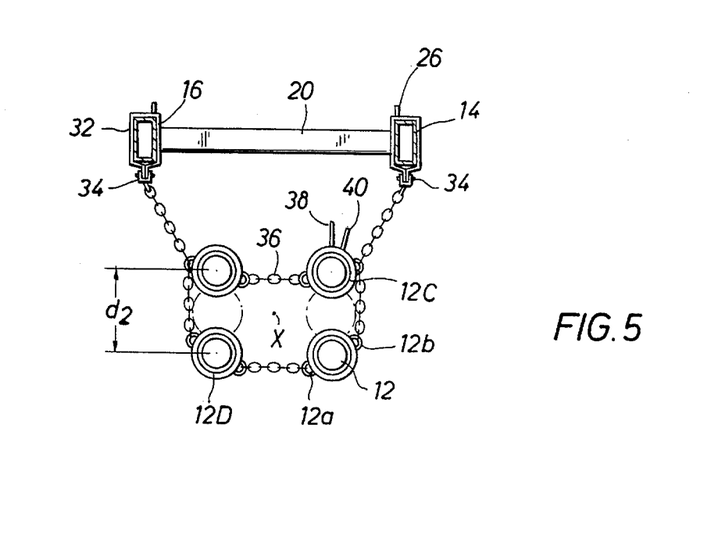
FIG. 5 is a view taken along line 5—5 of FIG. 2.

Each of the air guns 12 is suspended from the support frame 10 by longitudinally split, generally rectangular shaped clamps 32. Suitable bolt means 34 are used to tightly secure the clamps 32 to the frame members 14 and 16 and may also be used to attach the suspension chains 36 which mount the air guns 12 to the clamps 32. As shown in FIGS. 4 and 5, each of the air guns 12 have attachment lugs 12a and 12b formed thereon at one end, with the lugs 12a being attached to chains 36 and the lugs 12b being attached to cross chain 36'. Each of the guns 12 preferably is identical in construction and has the same air volume, so as to be interchangeable. The air guns 12 may be the Halliburton type SG-1 sleeve guns for example, which have been commercially available from that company since about 1985. As shown in FIGS. 2 and 3 the other end of each air gun 12 is provided with a similar pair of attachment lugs 12c and 12d and chain suspension to maintain each of the air guns horizontally disposed and in relatively fixed positions relative to each other to form the desired source array 10. As illustrated schematically in FIG. 5, each of the air guns 12 is operably connected to the umbilical of the cable apparatus C by conduits 38 and 40 to provide gun firing timing signals and a continuous supply of high pressure air to the firing chamber of each gun 12.

The array of air guns 12 is located on the frame 10 in a paired 2×4×2 arrangement that is symmetrically arranged about a longitudinal axis X—X as illustrated in FIGS. 2–5. The axis X—X is horizontal and parallel to the direction of travel of the vessel V, but may be offset to either the port or starboard side thereof. The tow cable C is preferably connected to the attachment fittings 26 adjacent the front cross member 18 by a conventional bridle or yoke 30. The opposite cross brace 24 then becomes the rear member relative to the direction of travel. If desired this arrangement may be reversed with cross brace 24 becoming the front member of the frame 10.

As illustrated in FIGS. 2 and 4, one pair 12A of the air guns 12 is operably mounted below the frame 10 between the front cross member 18 and the second cross member 20 and secured so that they are the same distance below the frame 10. Another pair 12B of air guns 12 is mounted between the third cross member 22 and the rear cross member 24 in positions identical to the front air guns 12. The common longitudinal axis of each front and rear gun lies in the same horizontal plane as, and is parallel to, the longitudinal axis X—X (FIG. 2) of the array. The depth of this horizontal plane below the water surface A is determined by the arrangement of chains 36 and length of lines L-1 and L-2 and, as noted above, is in the relatively shallow range of 1 to 3 meters.

Figure 6:
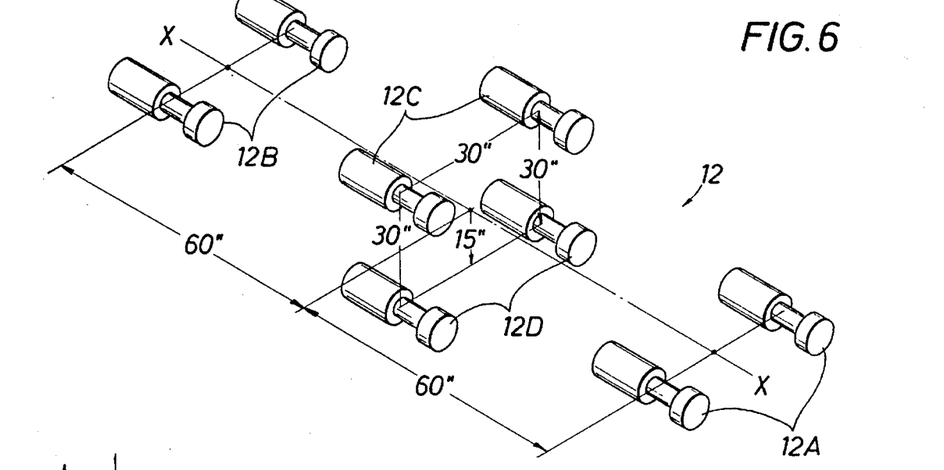
FIG. 6 is a schematic isometric view showing array geometry.

The four air guns in the middle of the array include pairs of upper and lower outside guns 12C and 12D mounted below the cross braces 20 and 22 on respective opposite sides of the axis X—X. The two guns on each side are in vertical alignment with one another, and the upper guns 12C are in a horizontal plane that is parallel to the plane of the lower guns 12D. As shown in FIGS. 5 and 6, these guns are symmetrical about the longitudinal axis X—X, and equidistant therefrom. The horizontal distance between the longitudinal axes of the front and rear pairs 12A and 12B of air guns 12 is shown in FIG. 4 as $d_1$ and with the equidistant spacing of each gun from the longitudinal axis X—X this is dx/2. The vertical distance between the center pairs 12C and 12B of air guns 12 is shown as distance $d_2$ (FIG. 5) and the air gun spacing above and below the horizontal plane defined by the longitudinal axis X—X is d2/2. The longitudinal spacing or horizontal distance between the centers of the air guns 12 forming the army is shown in FIG. 6. The horizontal distance between the geometric center of the air guns 12 between cross frame members 18 and 20 and frame members 20 and 22 is referenced as $d_3$, while the distance between centers of the air guns between frame members 20 and 22 and frames 22 and 24 is dimension $d_4$. Preferably the distances $d_3$ and $d_4$ are equal so that the air guns 12A and 12B constituting the front and rear pairs are spaced from the side pairs of the center cluster of guns at equal distances. The foregoing provides a 2×4×2 geometric arrangement or array having the characteristics of a tapered, heavy center, point source.

The following array dimensions are preferably employed:
$d_1$=30 in.
$d_2$=30 in.
$d_3$=5 ft.
$d_4$=5 ft.
These dimensions result in a compact array configuration that may be easily towed and easily handled from the vessel V. In a preferred embodiment, the upper pair of guns 12C is towed at a depth of 49.08 inches below the water surface, which locate the front and rear guns 12A and 12B at a depth of 64.08 inches. The lower pair of guns 12D are towed at a depth of 79.08 inches.

The chamber volume or size of the individual air guns 12 forming the array may be selected as desired. Contrary to conventional tuned array practice, the chamber volume of each of the air guns are identical. In accordance with the present invention, the chambers of each air gun 12 ranges in volume from 4 cu. in. to 10 cu. in. Air guns 12 having one of these two chamber volumes have been found well suited and are preferred for use in this array. Where 10 cu. in. chamber guns 12 are employed, a total chamber volume for the array is 80 cu. in. Where a higher frequency content of the seismic output signal of the array is desired, such as for the delineation of fine structures such as an engineering survey, the above array geometry and dimensions are maintained. However, if the chamber volume of each air gun 12 is reduced to 4 cu. in., the total volume of the array is reduced to 32 cu. in., which provides a useful seismic source where lower frequency control is desired. In utilizing the present invention, those skilled in the art may utilize a total chamber volume of greater than 80 cu. in. if desired.

Conventional descriptions of seismic source array waveform characteristics or signature include (1) a far-field time domain waveform as recorded over some broad frequency band, (2) the strength (in bar-m) computed from the peak-to-trough amplitude of the primary pulse, (3) the ratio of that strength to that of the first bubble pulse, and (4) a power spectrum of the waveform. None of these descriptors when used uncritically is a sufficient characterization of the pertinent seismic properties or qualities of a source. For example, although the primary-to-bubble amplitude ratio may be large over a broad frequency band, it can approach one over the lower frequency bands (such as 8 to 40 Hz) typical of deeper reflections. Examining the air gun array signatures through different narrow passband filters can provide relevant insights into the quality of array tuning and graphically demonstrate basic principles of a tuned array design.

USE AND OPERATION

In the use and operation of the apparatus of the present invention, the support frame 10 is assembled in the manner illustrated. The cylindrical air guns 12 are mounted on the frame 10 using the chain assembly 36 in the array configuration illustrated. The air guns 12 preferably are disposed so that their longitudinal axes are in a generally horizontal orientation when the float F is connected for seismic operation. The cable C is attached to the support frame 10 in a desired manner for towing, and the individual air guns 12 are operably connected to the air supply and firing controls via lines 38 and 40. The assembled apparatus I is then submerged in the body of water W with the air guns 12 positioned from depths of 1 to 3 meters below the water surface A. The 2×4×2 air gun configuration provides a tapered, heavy center output seismic signal. When the seismic signal source I and the streamer cable H are at predetermined distances behind the vessel V, towing commences.

To conduct a seismic survey, appropriate commands or gun control firing signals are transmitted from the vessel V through the cable C to fire the air guns 12. Preferably the gun firing is sequential from top to bottom of the array. That is, the upper pair of guns 12C is fired first, the front and rear pairs of guns 12A and 12B are fired second, and the lower pair of guns 12D is fired last. A time delay of 1.7 msec is used between each firing event, for a total of 3.4 msec delay from first to last. It will be recognized that use of this time delay ensures that the firing of each lower level of guns occurs after the initial wave front produced by an upper level of guns has passed that position. This particular firing sequence achieves or maximizes certain array signature qualities or characteristics which will be described in greater detail below.

The depth of an earth formation that can be accurately explored, defined and mapped by reflections from a seismic source signal is not unlimited. The useful power or energy of an output signal produced by any seismic source for earth formation exploration is only a portion of the total energy output of the source, and is largely dependent on the frequency characteristics of the acoustic power. In general, the lower the frequency of the seismic output signal, the greater the power available for penetration into deeper formations or stratas below the surface. The loss of usable signal power at higher frequencies is generally attributed to the attenuation and absorption of that portion of the energy during wave transit through the subsurface formations. To seismically explore earth strata at vertical depths up to 15,000 feet, a seismic signal having the wave energy power concentrated or maximized in the frequency range or bandwidth of about 5 to 100 hertz is desired. For shallower earth strata, depth investigations at a higher frequency range or bandwidth for the seismic signal energy usually is acceptable due to the reduced attenuation resulting from the shorter travel distance. For example, a frequency bandwidth range of about 20 to 125 hertz is usually acceptable for a seismic survey which explores to a maximum formation depth of about 10,000 feet. For even shallower earth depth, seismic surveys (normally classified as engineering rather than exploratory surveys) upper bandwidth frequencies ranging as high as about 256 hertz are usually acceptable.

The one-way linear depth or distance of seismic signal exploration sometimes is expressed in terms of the time (seconds) for the seismic signal to travel to the maximum depth earth strata being investigated and upon reflection return to the seismic transducers. This two-way elapsed time manner of expression of formation depth is dependent on or a function of the velocity or speed of the signal in passing through the earth strata. A two-way time of 1.0 second for a wave velocity of 6,000 feet per second will define formations at a depth of 3,000 feet while a two-way time of 2.0 seconds for a wave having an average velocity of 7,000 feet per second will provide a formation depth exploration at 7,000 feet. Many earth formations to be investigated or mapped have a seismic wave signal velocities in the range of 6,000 feet per second to 7,000 feet per second.

The sudden displacement of the surrounding water by air upon discharge or firing of a single air gun in a marine environment forms a bubble having a pressure crest that has theoretical and actual characteristics of both a transverse wave and a longitudinal wave. In a transverse wave the displacement of the particles of the medium are perpendicular to the direction of propagation of the wave while in a longitudinal wave the displacements of the medium particles are parallel to the wave direction. The theoretical and actual characteristics of both wave forms including the wave superposition principle are known to those skilled in the seismic signal source art. By pairing, grouping or clustering individual air guns in near proximity to form an array or subarray the resulting collective signal or output signature is, at least in part, a result of the superposition principle. The superposition principle for combining separate waves or pulse of individual air guns forming an array may be conceptually explained in the following manner. When two or more waves move simultaneously through a medium, each wave proceeds independently, as if the other is not present. The resulting "displacement" at any point and time is the vector (force and direction) sum of the "displacement" of the individual waves. If the resulting wave displacement is greater than the individual waves the two waves are said to interfere constructively. If the resulting displacement is less than an individual wave the waves are said to interfere destructively. In some instances complete cancellation of individual waves may occur.

Considerable experience has been acquired within the seismic industry in the technique of tuning marine air gun arrays using the superposition principle. The prime objective of air gun array tuning has been to reduce the strong oscillatory character of the bubble tail of the acoustic wave produced by the sudden release of compressed air in the water. The conventional technique for marine array tuning has been to employ air guns of different chamber volumes or capacities which, for a given charge pressure and depth of deployment, produce signatures which have different periods of oscillation. By appropriate choice of different air gun chamber sizes, an array may produce a signature in which the bubble tail is considerably reduced by the destructive interference of the individual bubble oscillations while the initial part of the wave is enhanced by the constructive summation generated by the simultaneous release of compressed air from all the contributing guns.

There are various characteristics or parameters which may be used to determine the quality of a marine source output signal or signature, particularly that which is produced by an air gun array. The first is the pressure or wave amplitude characteristic which is measured in terms of pressure or bars referenced to a hypothetical point nominally at one meter from the source. The unit is abbreviated to bar-meter (bar-m, or barm). A bar is a unit of pressure that is approximately one atmosphere or 14.5 psi. The total energy output of a particular source is a direct function of the bar-m amplitude that is usually displayed in the time domain as measured in milliseconds. In lay terms, the greater the bar-m magnitude the greater the total source energy or power.

A second quality measurement is the ratio of peak-to-peak amplitude of the initial wave to peak-to-peak amplitude of the bubble tail. A common term used to describe this ratio is primary-m-bubble ratio (P/B ratio) and front-m-back ratio (F/B ratio). In lay terminology, the bubble tail is part of the background noise that must be separated from the useful seismic signal. The isolation of the useful signal from the background noise ensures that better seismic data is obtained. In general a P/B ratio of 10 or more is considered exceptional. Often, the measured bar-m amplitudes and P/B ratios stated are those observed after filtering through a specific frequency passband or bandwidth and may differ to some degree from expected values.

A third wave quality parameter which is both qualitative and quantitative is based in part on a visual inspection of the shape or form of acoustical amplitude in the frequency domain or spectrum. The quantitative magnitude of acoustical amplitude is measured in decibels (db), which is a logarithmic unit of measurement of the difference in intensity levels or amplitudes of two sound waves and defined as 10 log 10 (I/Io). The exponential type decibel signature is used as an indication or measurement of the magnitude of acoustic power in the frequency domain. The decibel data spectrum should be as visibly smooth and as free as possible of nipples or notches across the frequency bandwidth of interest. The decibel amplitude spectrum may be quantified by defining or measuring the frequency bandwidth of interest within which the amplitude of a selected frequency component is within a 6 db increment of where the peak db signal occurs. Acoustic power or energy is mathematically determined as the area under the db curve or graph. Due to the logarithmic nature of the db scale, approximately half of the total usable acoustical pulse power or energy of the source signature is usually contained or concentrated within the frequency bandwidth of this 6 db peak increment signal range. Another quantitative approach is to specify that the db spectral curve or ripple across the bandwidth of interest should be less than 2 or 3 db. Some geophysicists scale these spectra in terms of db relative to 1 micropascal/Hz at 1 meter, or in terms of db relative to 1 joule/meter$^2$/Hz at 1 meter.

It is also well known that two identical, spatially well-separated air guns, when fired simultaneously, produce a far-field response which is essentially the sum of their individual contributions. That is, the bar-m amplitude is increased but the spectral shape of the acoustic pressure in the time domain is virtually unchanged. The minimum physical separation distance between air guns to achieve this independence is a variable which depends on gun chamber volume, water depth, and internal gun air pressure, but is largely related to the dimensions of the exhausted bubble of air. If the guns are deployed at some lesser distance, there is a component of air bubble interaction between the guns which modifies their response in a highly complex and complicated manner. This interaction effects the bubble oscillation by a reduction in the magnitude of the bubble and an increase in the period of the bubble oscillation. As the gun separation distance decreases, the components of bubble interaction increase. When two guns are brought close enough together, their emergent bubbles coalesce and their combined farfield signature begins to resemble in most characteristics that of a single gun whose volume equals the sum of the two component volumes. When the guns are positioned this close, they may be described as interacting.

There are other differences between the firing of a large volume single gun and a clustered or interacting pair of half-sized guns. In the latter case, the bubble has two sources instead of one which only coalesce towards the termination of its expansion. The mechanical components of the smaller air gun units are lighter and have less inertia than those of the larger size air guns for faster firing action in the millisecond time domain. There also is a larger total exhaust port area relative to the chamber volume in the case of a clustered pair. These physical and mechanical gun differences and others ensure the existence of many actual differences in output signal characteristics of seismic sources.

Air guns have often been used in interacting arrays and fired simultaneously to simulate signatures of single units whose chamber capacity is substantially equal to the sum of those of the clustered units. This technique was developed soon after the introduction of air gun arrays as marine sources in the mid-sixties. It also was recognized early on that a gun cluster arrangement was a more efficient seismic source than a single gun. For this reason, a plurality of air guns are conventionally employed in an array. The depth at which an air gun or an array is deployed also affects the source signature. This effect has been employed, from time to time, as a means of biasing the frequency spectrum to achieve array tuning by eliminating bubble or background noise. Valuable gains in array signature tuning can be obtained from the use of very shallow sources.

The potential continues to exist for the development of significantly improved characteristics of air gun array signatures. Any such improvement, in turn, will have a significant impact on the deconvolution process, signature extraction, the resolution of the recorded data and, ultimately, on the definition of the subsurface strata or formations explored by seismic studies.

Figures 7, 8:
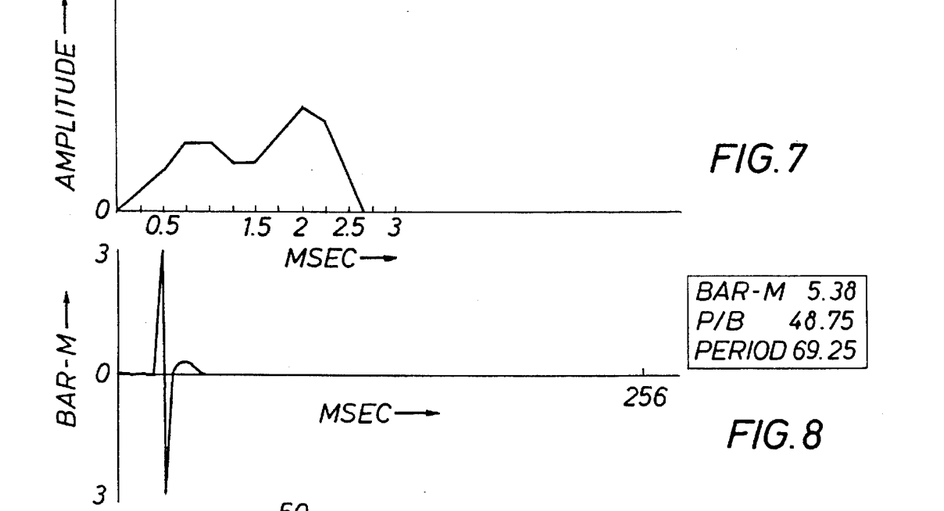
FIG. 7 is a graph illustrating the seismic source signal in terms of amplitude and elapsed time.
FIGS. 8 and 9 represent signature data for the sequentially fired array of the present invention.
Figure 9:
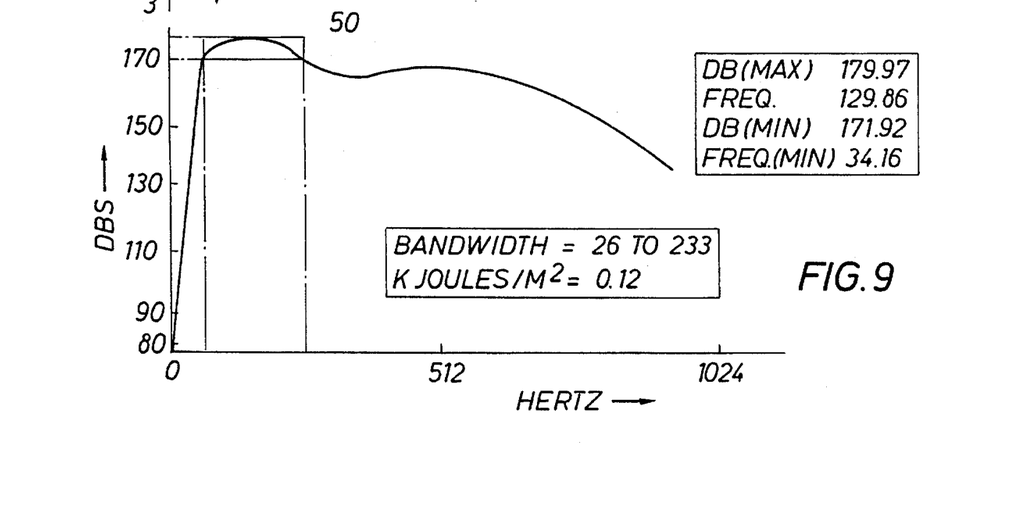

Exhaustive studies of various array configurations and gun firing methods have shown that the air guns clustered as disclosed herein and fired sequentially in gun pairs top to bottom with specified delay times give the best overall results when compared to other configurations and methods. FIG. 6 illustrates schematically the dimensional arrangement of the air gun cluster while FIGS. 8 and 9 show the characteristics of the seismic output signals from the array of FIG. 6. FIG. 7 plots the output signal in the time domain (0 to 256 milliseconds or msec) plotted horizontally as the ordinate versus the wave pressure amplitude, which can be expressed in bar-meters, plotted vertically as the abscissa. Mathematical integration of the plotted pressure wave amplitude determines the total energy of the signal produced by the source in the lower graph of FIG. 9, the acoustic output signal expressed in decibels is plotted as the abscissa with the linear frequency domain (0 to 1024 hertz) used as the graph ordinate. While a linear db scale is used for the abscissa, it should be noted that a decibel, by definition, is a logarithmic unit. A generally rectangular outline or boundary frame 50 is imposed on the db spectra curve of the lower graph which emphasizes the critical maximum 6 db spectrum and the frequency bandwidth information there displayed. The upper boundary dimension of this frame is set at the highest or peak db value of the signal, with the lower horizontal boundary dimension usually set at 6 db below the peak value. The parallel vertical components forming the boundary frame identify the power and upper frequency limits or bandwidth of the 6 db acoustical signal peak.

Mathematical integration of the entire db spectra curve determines the total acoustical energy produced by the seismic source. By integration of the db spectra within the boundaries of a particular range of lower and upper frequencies or bandwidth, the usable acoustic energy is determined. A rough or relative visual approximation of the usable acoustic energy may be made by comparing the shape and height of the db curve within the frequency bandwidth limits at the peak 6 db increment. About half of the total acoustic power or energy is concentrated in that bandwidth.

In addition, FIG. 8 displays certain calculated data in numerical form on the graphs. Of particular interest in this graph is the bar-m; P/B ratio; and period of bubble oscillation. In FIG. 9 two different display boxes for numerical data are used. The modeled numerical information displayed in the box at the lower left hand corner of the lower graph is the lower and upper frequency bandwidth range (in hertz) and the energy density (expressed in kilojoules per square meter) for the peak 6 db box or frame 50. The numerical information displayed in the box at the upper right corner of FIG. 9 is the calculated decibels (max. and min.) for the boundary frame 50 and the specific frequencies at which they occur.

Note that in the array of FIG. 6, the guns of each pair are spaced horizontally by a distance of 30 inches, and the side guns of the center cluster are spaced vertically by 30 in. and the front and rear gun pairs are disposed at a level or water depth mid-way between the upper and lower pairs of guns to provide sets of paired guns at three different water depths. As noted previously, the first pair of guns 12A are 60 in. ahead of the center cluster of guns 12C and 12D, and the rear pair of guns 12B also are 60 in. behind the center cluster. The upper gun pair 12C of the center cluster is located at a water depth of 49.08 inches while the front and back pairs are at a common water depth of 64.04 inches. The lower pair of center cluster guns are located at a water depth of 79.00 inches or meters. The guns are sequentially fired in pairs from top (shallowest water depth) to the bottom of the array. The firing order or sequence is initiated by discharge of the top pair 12C of the center cluster followed after a delay of 1.7 msec by the simultaneous firing of the front and rear pairs 12A and 12B which are disposed at the same, but deeper, water depth. After the same time delay of 1.7 msec the bottom gun pair 12D of the center cluster is fired. Since the front and back pairs are fired simultaneously, only two equal time delays are employed, for a total delay of 3.4 msec.

The typical numerical data for the various parameters of interest are summarized as follows:

| FIG. | Time Delay | Bar M | P/B | Period | DB (Max) | Freq. (Max) | DB (Min) | Freq. (Min) |
|---|---|---|---|---|---|---|---|---|
| 6 | 1.75 ms | 5.38 | 48.75 | 69.25 | 179.97 | 129.86 | 171.92 | 34.16 |

The bandwidth and energy density data for the peak 6 db increment of acoustical signal of the embodiment shown in FIG. 6 may be summarized as follows:

| FIG. | Delay | Bandwidth | Energy |
|---|---|---|---|
| 9 | 1.7 ms | 26 to 233 | 0.12 |

The concentration of acoustical energy of a usable frequency in the narrow hertz bandwidth clearly is enhanced. The time delay for a three dimensional air gun array as shown above tends to shift the usable frequency bandwidth of the peak db and peak 6 db increment of the array signature to the desired lower hertz values. In addition, the difference between the maximum and minimum hertz defining the peak 6 db increment signal within the shifted boundary frame also is compressed or narrowed. Such signal frequency modification occurs without a significant loss in total usable maximum db and 6 db peak increment of acoustical energy. For the array configuration of FIG. 6 a gun firing time delay in the range of 0.75 msec to 2.5 msec should be used, and a value of 1.75 appears to be optimum.

The foregoing disclosure and description of the invention are illustrative and explanatory thereof, and various changes in size, shape, arrangement and materials, as well as in the details of the illustrated construction, may be made without departing from the spirit of the invention. Likewise the foregoing disclosure and description of the operation of the invention are illustrative and explanatory thereof, and various deviations or changes in the manner of operation may be made without departing from the spirit or heart of the present invention.

What is claimed is:

1. A method of generating a marine seismic source below the surface of a body of water comprising the steps of:

providing first, second and third pluralities of air guns with said second plurality having twice the number of air guns as first or third pluralities, said first plurality being located at a shallower water depth than said second plurality, and said third plurality being located in a grater water depth than said second plurality;

discharging said first, second and third pluralities of air guns in consecutive order; and delaying the discharge of said second and third pluralities of air guns until the initial wavefront from the discharge of an upper plurality of guns has passed.

2. The method of claim 1 wherein the delay time of said delaying step is in the range of from 0.75 to 2.5 msec.

3. The method of claim 1 wherein the delay time of said delaying step is 1.75 msec.

4. The method of claim 1 wherein said first, second and third pluralities of air guns are arranged about a longitudinal axis of symmetry.

5. The method of claim 1 including the further step of arranging said second plurality of air guns to have twice as many guns as said first or said third pluralities of air guns, and locating said second plurality of air guns between said first and third pluralities of air guns to provide a tapered, heavy centered seismic source array.

6. An apparatus adapted for producing a seismic signal in a marine environment with an air gun array located below the surface of a body of water and towed behind and controlled from an operating vessel, comprising:

a support frame;

means for securing said support frame to a towing line from the vessel;

means for locating and supporting said support frame at a predetermined depth below the water surface;

array means for producing a seismic output signal having a characteristic signature, said array means including vertically spaced pluralities of air guns arranged to form the seismic signal when said pluralities of air guns are discharged;

means for mounting each of said pluralities of air guns on said support frame in a manner such that the uppermost plurality of air guns is suspended substantially 1 meter below the water surface and the lowermost plurality of air guns is suspended substantially 3 meters below the water surface; and means for sequentially firing said pluralities of air guns in a manner such that said uppermost plurality is fired first and said lowermost plurality is fired last, therein being a predetermined time delay in the range of from 0.75 to 2.5 msec between said firings to maximize the acoustical energy of the array signature in a lower frequency bandwidth.

7. The apparatus as set forth in claim 6 including an intermediate plurality of air guns located between said uppermost and lowermost pluralities, said intermediate plurality of air guns being fired after said uppermost plurality and before said lowermost plurality.

8. The apparatus as set forth in claim 6 wherein said sequential firing means includes means for introducing about a 1.75 msec delay between each firing event.

9. The apparatus as set forth in claim 7 wherein said uppermost plurality of air guns and said lowermost plurality of air guns are each constituted by a pair of air guns and said intermediate plurality of air guns is constituted by front and rear pairs of air guns, said uppermost pair being located directly above said lowermost pair and spaced therefrom by substantially 30 inches, each of said pairs being laterally spaced by substantially 30 inch, each of said front and rear pairs of air guns being longitudinally spaced from said intermediate plurality of air guns by substantially 60 inches to provide a tapered, heavy centered seismic source array.

* * * * *